(12) United States Patent
Price et al.

(10) Patent No.: US 6,324,237 B1
(45) Date of Patent: Nov. 27, 2001

(54) SHEET COUNTING APPARATUS AND METHOD

(75) Inventors: John Gerwyn Price, Hants; Gareth James Ayre, Somerset, both of (GB)

(73) Assignee: De La Rue International Limited, London (GB)

( * ) Notice: Subject to any disclaimer, the term of this patent is extended or adjusted under 35 U.S.C. 154(b) by 0 days.

(21) Appl. No.: 09/194,869

(22) PCT Filed: Oct. 13, 1997

(86) PCT No.: PCT/GB07/02811

§ 371 Date: Dec. 4, 1998

§ 102(e) Date: Dec. 4, 1998

(87) PCT Pub. No.: WO98/18103

PCT Pub. Date: Apr. 30, 1998

(30) Foreign Application Priority Data

Oct. 17, 1996 (GB) .................................................. 9621691

(51) Int. Cl.[7] .................................................. G06M 11/00
(52) U.S. Cl. .................................................. 377/8
(58) Field of Search .................................................. 377/8

(56) References Cited

U.S. PATENT DOCUMENTS

| | | | |
|---|---|---|---|
| 3,826,487 | 7/1974 | Forster et al. | 271/263 |
| 3,862,402 | 1/1975 | Igarashi et al. | 235/92 B |
| 4,535,463 | 8/1985 | Ito et al. | 377/8 |
| 4,974,237 | 11/1990 | Grabowski | 377/8 |

FOREIGN PATENT DOCUMENTS

| | | |
|---|---|---|
| 239888 | * 10/1911 | (DE) . |
| 557407 | * 8/1932 | (DE) . |
| 1 288 345 | 1/1969 | (DE) . |
| 0 616 300 A2 | 9/1994 | (EP) . |
| 2 038 521 A | 7/1980 | (GB) . |
| 2 039 112 A | 7/1980 | (GB) . |
| 2 152 212 A | 7/1985 | (GB) . |
| 57-132005 | 8/1982 | (JP) . |
| WO 93/17871 | 9/1993 | (WO) . |

* cited by examiner

*Primary Examiner*—Margaret R. Wambach
(74) *Attorney, Agent, or Firm*—Oliff & Berridge, PLC

(57) ABSTRACT

Sheet counting apparatus comprises a sheet support (2–4) for holding a stack of sheets (13) to be counted. A sheet feed device (14) moves the sheets individually from a first position to a second position while they remain held together in the stack (13). A counter (23) monitors movement of the sheet as it is moved from the first position to the second position, and increments a count when such movement is detected.

15 Claims, 4 Drawing Sheets

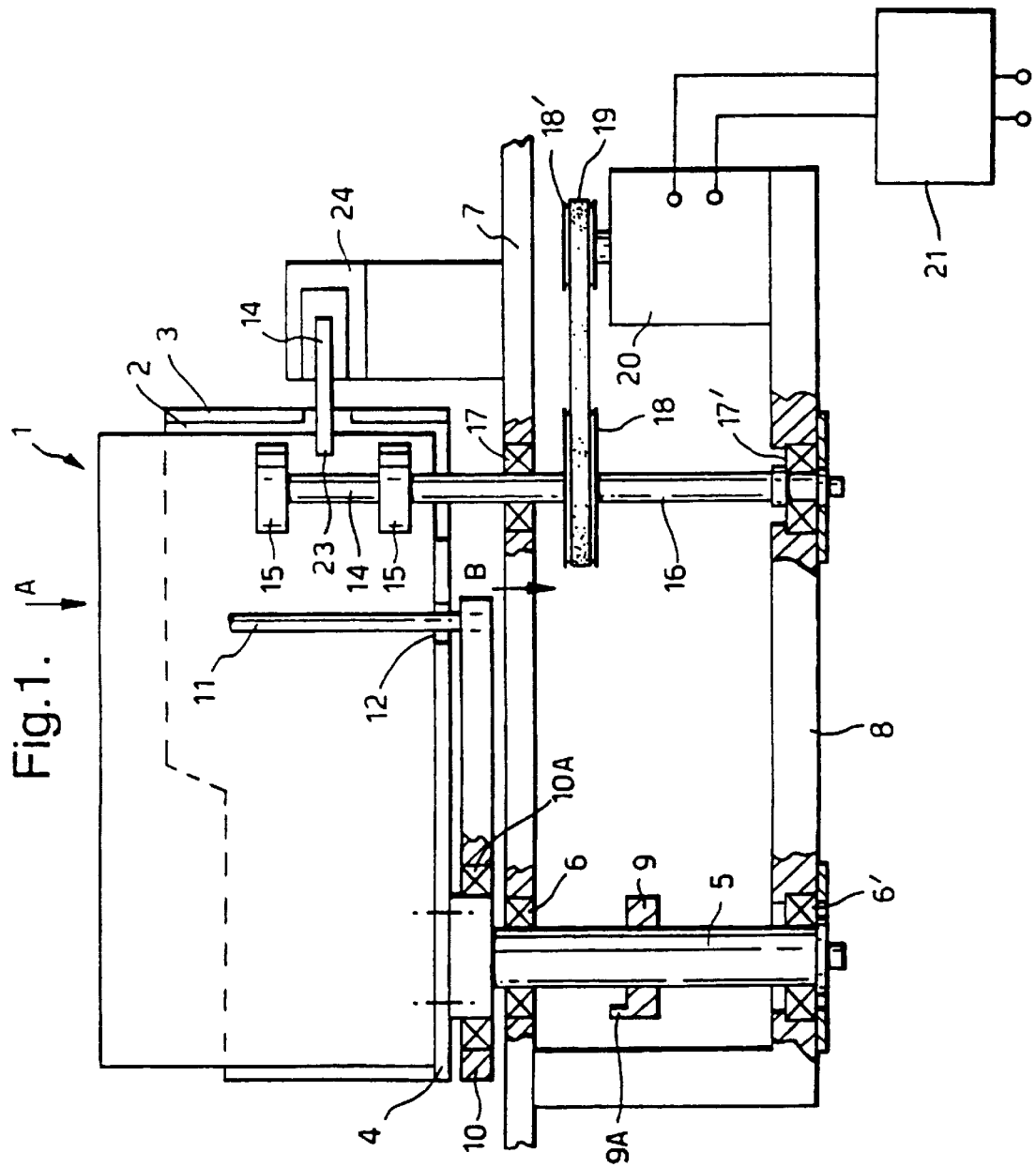

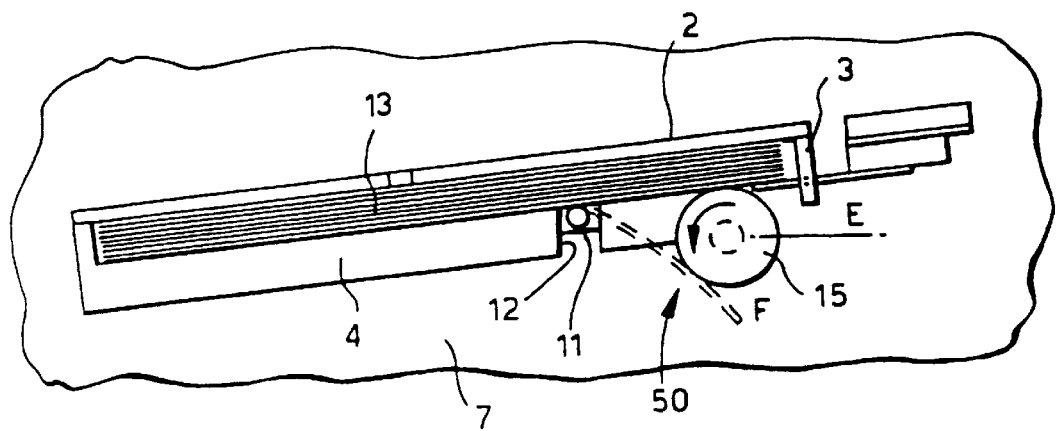
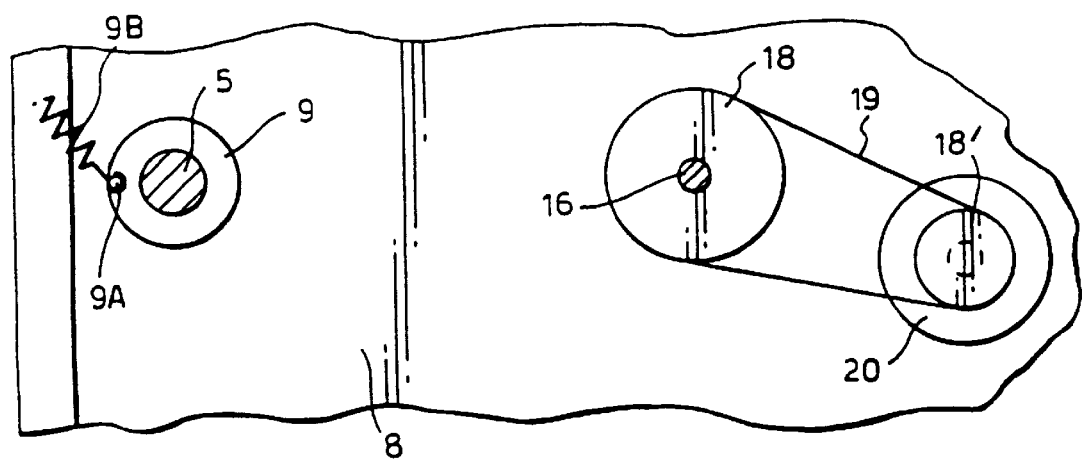

SHEET COUNTING APPARATUS AND METHOD

The invention relates to sheet counting apparatus and methods of counting sheets, for example for counting flexible sheets such as banknotes or other security type documents. The apparatus and method can also be used for verifying the total number of sheets within a preformed bundle or stack of such sheets.

Many machines have been described and implemented in the past for counting stacks of sheets such as banknotes in which the stack remains intact. A recent example is EP-A-0616300. In this case, rotatably mounted suction spindles are mounted for movement past the bundle of sheets to be counted/verified, each spindle rotating so as to lift the attracted sheet away from the adjacent sheet in the stack to an extent that the following spindle is moved into the space between the sheets while at substantially the same time it attracts a following sheet to be counted. The change in suction pressure is used to count the sheets. Similar devices are described in GB-A-2039112, GB-A-2038521 and GB-A-2152212.

DE-A-239888 discloses a further example in which a lifting and transporting carrier roller lifts sheets from the stack to the counted position. The number of rotations of this drive roller is used to count the number of notes.

DE-A-557407 describes a sheet picking mechanism in which a number of fingers are attached to the circumference of a grab disc and a carrier is provided near each finger which switches a counter disc from which the number of sheets counted can be read.

In all these known systems, sheets are counted indirectly. That is, the systems assume that a sheet is correctly moved from the first to the second position by monitoring aspects of the system such as a change in vacuum level or the like. Clearly, in the case of banknotes and the like, there is a significant problem if there is a miscount.

In accordance with one aspect of the present invention, a method of counting sheets held together in a stack comprises moving the sheets individually from a first position to a second position while they remain held together in the stack; monitoring movement of the sheet as it is moved from the first position to the second position; and incrementing a count when such a movement is detected.

In accordance with a second aspect of the present invention, sheet counting apparatus comprises a sheet support for holding a stack of sheets to be counted; a sheet feed device for moving the sheets individually from a first position to a second position while they remain held together in the stack; and a counter for monitoring movement of the sheet as it is moved from the first position to the second position, and for incrementing a count when such movement is detected.

In contrast to the known systems, the invention directly monitors movement of the sheet itself as it is moved from the first position to the second position. It does not rely on-monitoring some other aspect of the system and thus significantly increases the reliability of the count.

Movement could be monitored by viewing the sheets as they are counted, for example by irradiating the sheets from a laser beam or the like and monitoring reflected light, the degree of reflection varying as the sheet is moved.

In the preferred arrangement, however, the monitoring step comprises engaging a leading sheet in the stack with a sensing member and monitoring movement of the sensing member. By using a sensing member which engages the leading sheet in the stack, a very positive and reliable response is obtained upon movement of the sheet.

Typically, vibratory movement of the sensing member is monitored. This could involve simply determining whether or not the sensing member is vibrating but in a more sophisticated approach, which minimises error due to noise and the like, the monitoring step comprises comparing the vibration frequency with a threshold and determining that movement of the sheet is occurring if the vibration frequency exceeds the threshold.

This is advantageous over known edge detection systems such as described in U.S. Pat. No. 4,974,237 in that it is independent of edge quality. Furthermore, the apparatus is advantageous over the example described in U.S. Pat. No. 3,826,487 since it is independent of thickness and is not limited to detecting sheets on a transport.

The arm movement detector can be provided by a vibration sensor of any convenient contact or non-contact type but typically comprises a piezo-electric device.

Preferably, the counter comprises an arm which engages a sheet stack in the sheet stack support in use, and an arm movement detector. Various types of arm movement detector are known as shown, for example, in U.S. Pat. No. 3,826,487 and U.S. Pat. No. 4,974,237.

Preferably, an end of the arm which engages the sheet stack is provided with an uneven material to promote vibratory movement. This material could be an abrasive material.

The sheet feed device can be of any conventional type including spindle counters and the like as described in any of the prior art documents mentioned above. In a preferred arrangement, the sheet feed device comprises a sheet feed member mounted to rotate about its own axis and positioned so as to engage a stack of sheets held by the sheet support; and means for rotating the sheet feed member, the arrangement being such that rotation of the sheet feed member causes free ends of successive sheets in the stack to be moved between the sheet feed member and the remainder of the stack towards the other ends of the sheets in the stack, in the direction of rotation of the sheet feed member, and so to the second position while the sheets remain held by the sheet support.

This is much simpler than the known suction spindle apparatus and thus is less prone to failure and will have a reduced manufacturing cost. A further advantage is that it is more tolerant of misalignment of the ends of sheets and sheet edge condition than a suction spindle counter.

The sheet feed member typically comprises a friction feed roller whereby upon rotation of the sheet feed member, frictional engagement between the sheet feed member and an adjacent sheet causes the sheet to be moved to the counted position. Typically, the sheet feed member will have a high friction surface.

The sheet feed member could, however, comprise a suction member such as a rotatable roller having at least one hole connected to a vacuum source so as to suck an adjacent note onto the roller as the roller passes the stack and to carry the note to the counted position.

Although the apparatus could be implemented with a single sheet feed member, in some applications more than one sheet feed member could be provided mounted substantially coaxially. This assists in the counting of relatively wide sheets.

The biasing means could be provided by a controlled mechanism which moves one or other or both of the sheet support and the sheet feed member towards each other in a controlled manner during the counting operation. Conveniently, however, the biassing means comprises a resilient member such as a tension spring.

The or each sheet feed member could be directly driven by the rotating means but in the preferred arrangement the or each sheet feed member is mounted to a spindle which is connected to a pivoted arm allowing movement of the spindle and hence the sheet feed member towards and away from the sheet support. In some cases, the or each sheet feed member can be rotatably mounted to the spindle but this requires that each sheet feed member is independently driven. Conveniently, therefore, the or each sheet feed member is non-rotatably mounted to the spindle which is rotatably mounted to the pivoted arm.

The invention also extends to a sheet movement sensing assembly comprising a sensing member which is urged towards and engages a sheet in use; and a vibration sensor for sensing vibratory movement of the sensing member due to the passage of the sheet. Such an assembly could be used in other types of apparatus such as sheet transports and the like in which sheets are bodily moved past the sheet sensing assembly.

Some examples of a banknote counters/verifiers for carrying out methods according to the invention will now be described with reference to the accompanying drawings, in which:

FIG. 1 is a side elevation of the apparatus;

FIG. 2 is a plan of the apparatus shown in FIG. 1 taken in the direction A;

FIG. 3 is a plan of the apparatus beneath the top plate shown in FIG. 1 and taken in the direction of arrow B;

Figure 4:
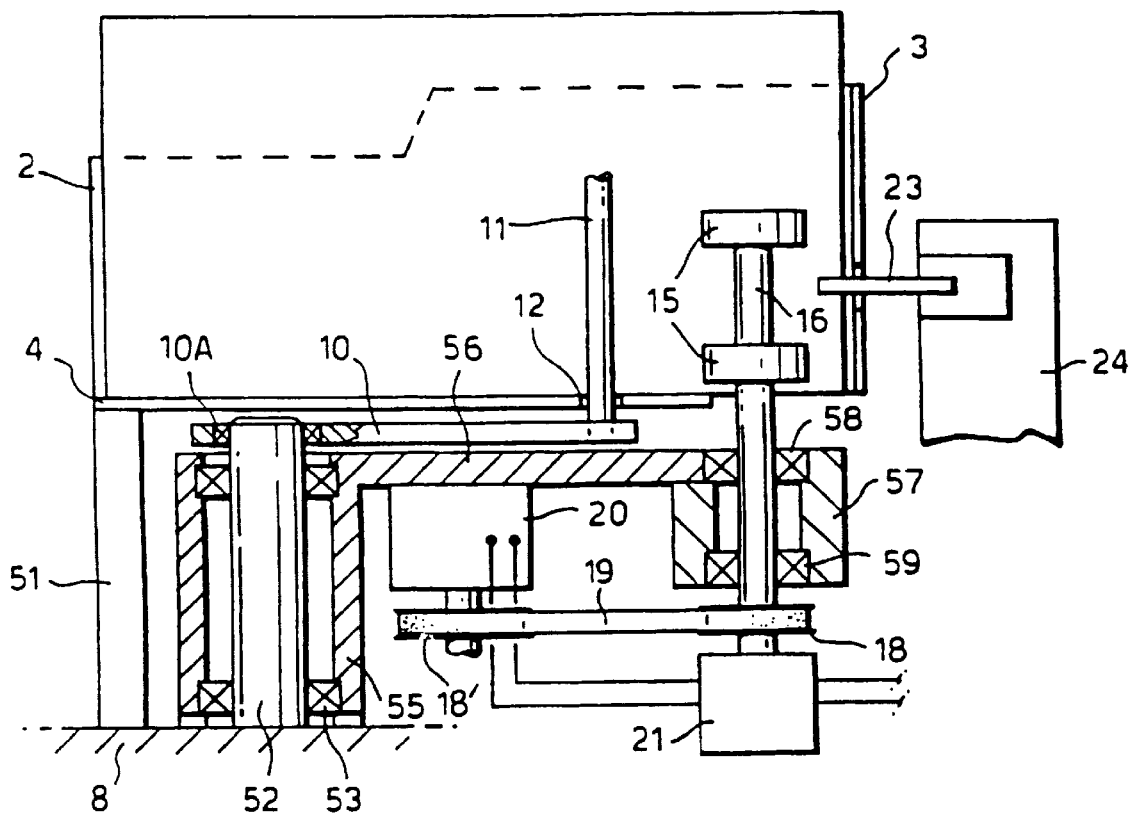
FIG. 4 is a side elevation similar to FIG. 1 but of a second example.

FIGS. 1 to 3 illustrate a banknote counter/verifier 1 having a sheet stack support comprising a back plate 2, a stop plate 3 and a support plate 4. The support plate 4 is non-rotatably mounted to a pivot shaft 5 which is journalled in bearings 6,6' held respectively by an upper support plate 7 and a base plate 8. A collar 9 is secured to the shaft 5 and carries a lug 9A to which a tension spring 9B (FIG. 3) is connected. The other end of the tension spring 9B (not shown) is secured to another part of the apparatus so that the shaft 5 is biassed to rotate in a clockwise direction as shown in FIG. 3.

A stack clamp 11 is mounted to an arm 10 rotatably mounted via bearings 10A to the shaft 5. The clamp 11 is biassed by means such as a tension spring (not shown) to pivot in an anti-clockwise direction as shown in FIG. 2. The support plate 4 includes a slot 12 through which the clamp 11 extends so as to allow the clamp to pivot into engagement with a stack of sheets 13 held on the sheet stack support.

A friction feed assembly 14 is positioned adjacent the sheet stack support and comprises a pair of sheet feed rollers 15 having relatively high friction surfaces, the rollers 15 being non-rotatably mounted to a shaft 16 which is journalled between bearings 17,17' held by the upper support plate 7 and the base plate 8 respectively. A toothed pulley 18 is secured to the shaft 16, the pulley 18 engaging a toothed belt 19 which extends around a pulley 18' connected to a motor 20. A control system 21 is connected to the motor 20 to control operation of the motor.

In operation, a stack of sheets 13 is loaded into the sheet stack support and due to the biassing mechanisms provided, this stack will be held between the back plate 2 and the clamp 11. The tension spring 9B urges the stack 13 into engagement with the rollers 15. The motor 20 is actuated to cause the shaft 16 to rotate in an anti-clockwise direction, as seen in FIG. 2, and as the rollers 15 rotate, the frictional engagement between their surfaces and the adjacent sheet in the stack 13 causes the end section of the sheet adjacent the stop plate 3 to be drawn past the rollers 15 to a counted or second position 50 shown in dashed lines in FIG. 2. The biassing force applied by the tension spring 9B will maintain contact between the rollers 15 and the next adjacent sheet in the stack 13 so that continued rotation of the rollers 15 will cause the ends of successive sheets to be transferred to the counted position 5.

Figure 6:
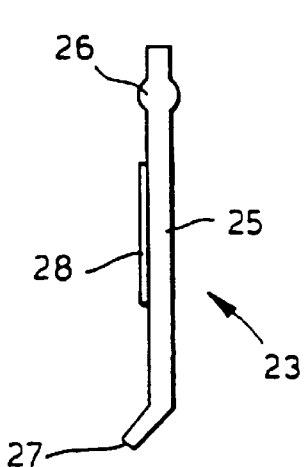
FIG. 6 illustrates the sheet movement detection stylus in more detail.
Figure 7:
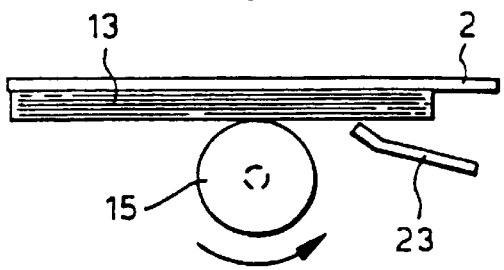
FIG. 7 illustrates the stylus of FIG. 6 in use.

In order to count the sheets as they are moved, a system including a stylus 23 mounted to a support 24 is provided. The stylus 23 is shown in more detail in FIG. 6. The stylus comprises an arm 25 which is pivoted at 26 to the support 24 and biassed (by means not shown) towards the sheet stack 13. The biassing means maintains a substantially constant force between the stylus and the sheet stack. FIG. 7 illustrates the region of contact between the stylus 23 and the stack 13. The tip 27 of the stylus is coated with an uneven or rough material which engages the sheet stack 7 as the sheet moves under the influence of the rollers 15 so as to vibrate the stylus. This vibration is detected using a piezo-electric bi-morph strain gauge 28 bonded to the stylus.

Figure 8:
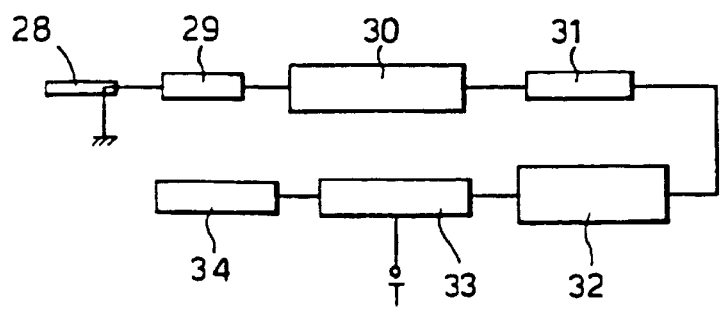
FIG. 8 is a block circuit diagram illustrating the counting electronics.

The strain gauge 28 is connected to an electrical circuit which is shown in block diagram form in FIG. 8. Signals (FIG. 9) from the gauge 28 are passed to a high input impedance buffer 29 which is mounted close to the gauge to reduce pick-up. The signal from the buffer 29 is high pass filtered by a filter 30 to remove all DC and low frequency noise, such as mains hum. The signal is then rectified by a rectifier 31 and fed to a low pass filter 32. After filtering, the signal is fed to a comparator 33 where it is compared with a voltage threshold T and the resulting square wave is fed into a counter 34. The counter 34 will be attached to a display or the like so that the number of sheets counted can be viewed by the operator.

Figure 9:
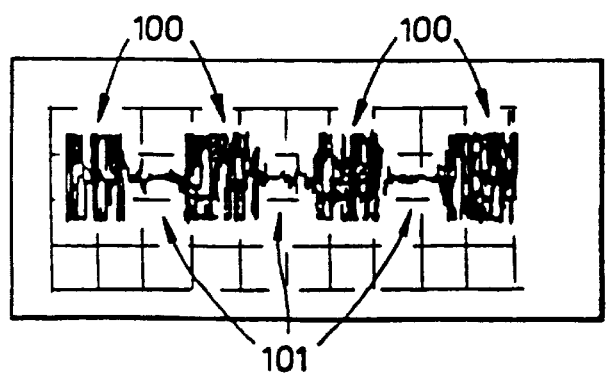
FIG. 9 illustrates the output signal from the stylus.

The effect of moving sheets on the stylus 23 can be seen in FIG. 9. During movement of a sheet, high frequency vibration of the stylus 23 will be at a relatively high level as shown at 100. When a sheet has passed beyond the stylus 23, the stylus will drop onto the next sheet in the stack which will be stationary and thus there will be very little, if any, vibration of the stylus as indicated at 101 in FIG. 9. This change in level is detected by suitably setting the threshold supplied to the comparator 23 and used by the counter 34 to increment the count as already described.

Figure 5:
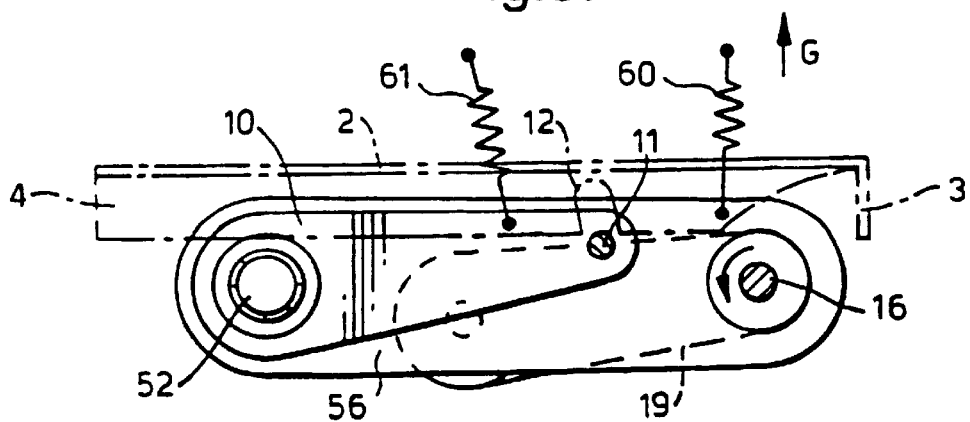
FIG. 5 is a plan of the apparatus shown in FIG. 4 but with the top plate removed.

The example shown in FIGS. 4 and 5 differs from the previous example primarily in the fact that the sheet stack support is fixed to the base rather than being pivotable. For simplicity, those components in FIGS. 4 and 5 which are the same as those shown in FIGS. 1 to 3 have been given the same reference numerals. Thus, the support plate 4 of the sheet stack support is secured via a wall 51 to the base plate 8. A pivot 52 is secured to the base plate 8 and rotatably supports via bearings 53,54 a sleeve 55 coupled to an arm 56. The arm 56 carries, at its end remote from the sleeve 55, a further sleeve 57 to which the shaft 16 is rotatably mounted via bearings 58,59. Mounted on the under side of the arm 56 is the motor 20. The arm 56 is biassed to rotate in an anti-clockwise direction about the pivot 52, as seen in FIG. 5, by a tension spring 60 connected between the arm 56 and another part of the apparatus. Also biased in an anti-clockwise direction about pivot 52, by a tension spring 61 connected between it and another part of the apparatus, is arm 10 rotatably mounted via bearings 10A in this example to pivot 52. As before, stack clamp 11 is mounted to arm 10.

The advantage of the example shown in FIGS. 4 and 5 over that shown in FIGS. 1 to 3 is that means (not shown) can more easily be provided to rotate together the arms 10 and 56 in the clockwise direction to effect loading/unloading the stack of sheets 13 into the sheet stack support.

The apparatus may be operated manually so as to move the various biassed components to enable a stack of sheets to be loaded to the support. However, it would also be possible for these movements to be automatically controlled by connecting the movable components to suitable actuators coupled in turn to a control system. This would include, of course, the stylus support 24.

What is claimed is:

1. A method of counting sheets held together in a stack, the method comprising:

successively moving a first end of each sheet of the stack individually from a first position to a second counted position, while second ends of the sheets remain held together in the stack;

independently from moving each sheet, directly monitoring, for each sheet, movement of the first end of that sheet as that sheet is moved from the first position to the second counted position; and incrementing, for each sheet, a count when the movement of that sheet is detected.

2. A method according to claim 1, wherein the directly monitoring step comprises:

engaging for each sheet in the stack, that sheet with a sensing member; and monitoring. for that sheet, movement of the sensing member.

3. A method according to claim 2, wherein monitoring movement of the sensing member comprises monitoring vibratory movement of the sensing member.

4. A method according to claim 3, wherein the directly monitoring step comprises:

determining, for each sheet, a vibratory frequency of the vibratory movement of the sensing member;

comparing, for each sheet, the determined vibratory frequency with a threshold; and determining, for each sheet, that movement of the first end of that sheet is occurring if the determined vibration frequency exceeds the threshold.

5. A sheet counting apparatus comprising:

a sheet support usable to hold a stack of sheets to be counted;

a sheet feed device usable to successively move a first end of each sheet of the stack of sheets individually from a first position to a second counted position while second ends of the sheets of the stack of sheets remain held together in the stack; and a counter, independent from the sheet feed device, usable to directly monitor movement of the first end of each sheet as that sheet is moved from the first position to the second counted position, and usable to increment a count when the movement of that sheet is detected.

6. Apparatus according to claim 5, wherein the counter comprises:

an arm engagable with the stack of sheets held in the sheet stack support; and an arm movement detector.

7. Apparatus according to claim 6, wherein the arm movement detector comprises a strain gauge.

8. Apparatus according to claim 6, wherein the arm movement detector comprises a piezo-electric device.

9. Apparatus according to claim 6, wherein the arm which engages the sheet stack has an end having an uneven surface that is engagable with the stack of sheets, the uneven surface promoting vibratory movement.

10. Apparatus according to claim 5, wherein the sheet feed device comprises:

at least one sheet feed member mounted to rotate about its own axis and positioned so as to engage a stack of sheets held by the sheet support; and means for rotating the at least one sheet feed member, wherein rotation of the at least one sheet member causes the at least one sheet feed member to successively move the first end of each sheet in the stack from the first position between the at least one sheet feed member and the remainder of the stack in the direction of rotation of the at least one sheet feed member towards the second ends of the sheets in the stack to the second counted position, while the second ends of the sheets remain held by the sheet support.

11. Apparatus according to claim 10, wherein the sheet support and the at least one sheet feed member are relatively moveable under the action of a biasing member that urges the at least one sheet feed member towards the sheet support.

12. Apparatus according to claim 11, wherein each at least one sheet feed member is mounted to a spindle which is connected to a pivoted arm allowing movement of the spindle and hence the at least one sheet feed member towards and away from the sheet support.

13. Apparatus according to claim 11, wherein the biasing member comprises a resilient member.

14. Apparatus according to claim 13, wherein the resilient member is a tension spring.

15. Apparatus according to claim 10, wherein at least one of the at least one sheet feed member comprises a friction feed roller which, upon rotation, moves the first ends of the sheets to the second position under the influence of friction.

* * * * *